United States Patent [19]

Ciciora

[11] 4,091,418
[45] May 23, 1978

[54] AUTOMATIC CHANNEL EQUALIZATION WITH TIME BASE EXPANSION

[75] Inventor: Walter S. Ciciora, Park Ridge, Ill.

[73] Assignee: Zenith Radio Corporation, Glenview, Ill.

[21] Appl. No.: 773,718

[22] Filed: Mar. 2, 1977

[51] Int. Cl.² ............................................. H04N 5/14
[52] U.S. Cl. ..................................... 358/160; 358/139
[58] Field of Search ................. 358/10, 139, 160, 187

[56] References Cited
U.S. PATENT DOCUMENTS

| | | | |
|---|---|---|---|
| 3,730,984 | 5/1973 | Smith | 358/139 |
| 3,989,891 | 11/1976 | Freestone | 358/139 |

Primary Examiner—Richard Murray
Attorney, Agent, or Firm—Jack Kail

[57] ABSTRACT

An automatic channel equalization system for use with a television receiver includes a control section for automatically operating a transversal equalizer according to the distortion exhibited by a reference signal transmitted through the channel. The television line including the transmitted reference signal is supplied to the control section through a time base expander enabling the implementation of a relatively fast sampling rate for achieving full bandwidth equalization of the channel with relatively slow-speed signal processing technology.

19 Claims, 9 Drawing Figures

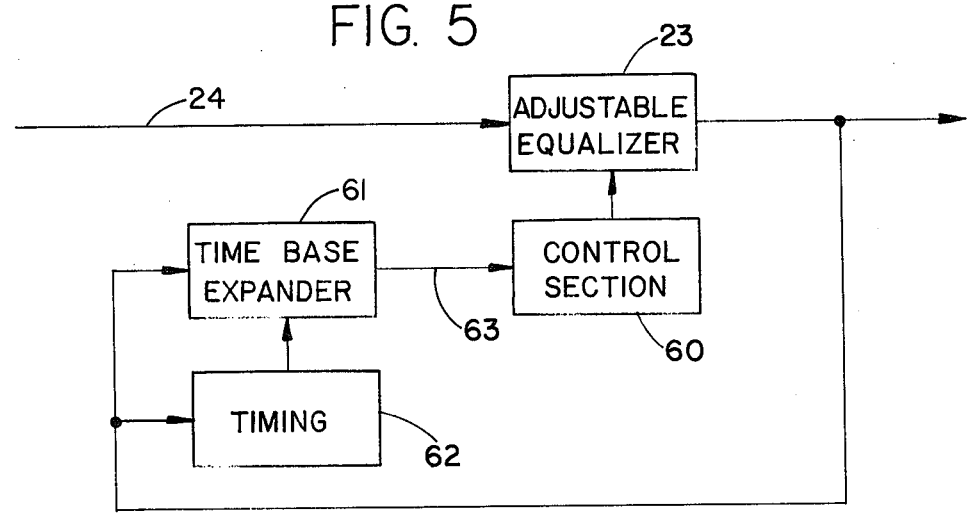
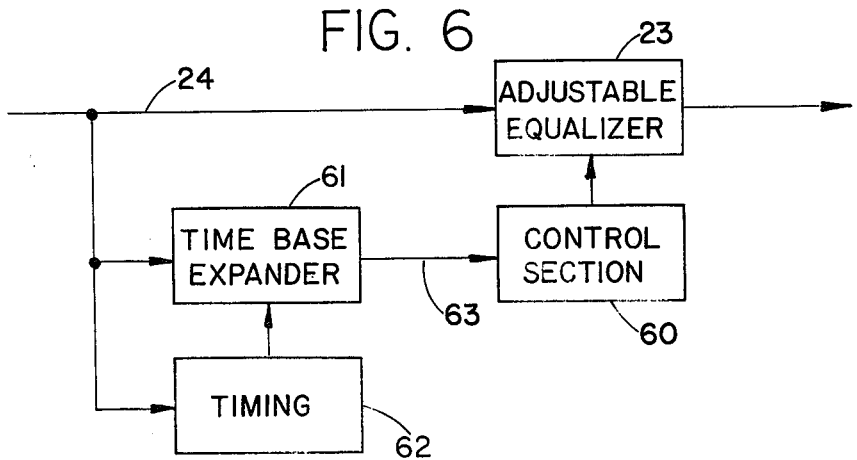
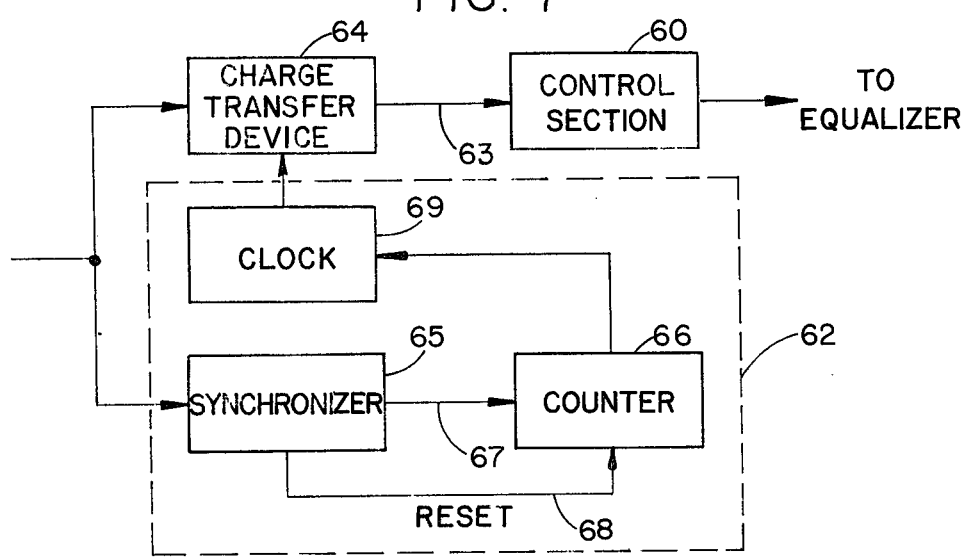

| SAMPLE INTERVAL | $S_4$ | $S_3$ | $S_2$ | $S_1$ |
|---|---|---|---|---|
| 1 | 0 | 0 | 0 | 0 |
| 2 | 0 | 0 | 0 | 1 |
| 3 | 0 | 0 | 1 | 1 |
| 4 | 0 | 1 | 1 | 1 |
| 5 | 1 | 1 | 1 | 1 |
| 6 | 0 | 1 | 1 | 1 |
| 7 | 0 | 0 | 1 | 1 |
| 8 | 0 | 0 | 0 | 1 |
| 9 | 0 | 0 | 0 | 0 |

AUTOMATIC CHANNEL EQUALIZATION WITH TIME BASE EXPANSION

BACKGROUND OF THE INVENTION

The present invention relates generally to automatic equalization of communication channels and, more particularly, to techniques for automatically reducing the effects of linear distortion in television channels.

The presence of linear distortion in a communication channel is a well known problem which deleteriously affects data transmission efficiency through the channel. In this regard, a band limited communication channel having a linear transmission characteristic is conventionally considered as being distortionless when characterized by a flat amplitude versus frequency response and linear phase response passing through zero degrees at zero frequency. Thus, any variance from these ideal channel behavioral responses will have the result of distorting the channel's transmission characteristics. In a television channel, for example, numerous effects are known to have an influence on the integrity of a video signal between its origin at the transmitter and its eventual application to a television picture tube for reproduction on the televised image. One common distortion producing effect is that of multipath transmission caused by the presence of various forms of signal reflectors in the transmission path of the television channel. As a consequence of the presence of these signal reflectors, the net signal collected at the television receiver antenna consists of the sum of the desired or main signal propagated between the transmitter and receiving antenna along a direct path and one or more reflected signals, commonly referred to as "echos", delayed in time and attenuated with respect to the main signal. In the television receiver, the reflected signals are transformed into electrical signals having substantially the same waveform as the main signal, but generally delayed in time and attenuated in amplitude therefrom. This effect is observably manifested by the production of replica images, normally referred to as "ghosts", displayed on the viewing screen from the image produced by the main signal. Ghost producing reflections of the foregoing type are commonly categorized as post-echos since they arrive at the television receiver antenna later in time than the main signal. Devices intended to remove such post-echos from the net signal collected by the television receiver antenna are usually referred to as ghost cancellation systems.

In addition to distortion resulting from post-echos caused by multipath transmission, imperfections in the video signal path of the television receiver itself also have a distorting influence on a processed video signal. Among other factors, antenna and tuner frequency response tilt as well as misalignment of the IF section of the receiver can result in imperfect channel transmission characteristics. Since these latter types of distortion are linear in nature, paired-echo theory indicates that they can be approximated in terms of appropriate sets of paired echos displaced in time about the undistorted transmitted signal. More specifically, the response of a linear distortion producing channel to an applied video signal is known to consist of the main undistorted transmitted signal plus at least one pre-echo similar in shape to the undistorted signal but preceding it in time by some amount $T_1$ and a corresponding post-echo also similar in shape to the undistorted signal but following it in time by the amount $T_1$. A full description and justification of this theory may be found in an article by H. A. Wheeler entitled "The Interpretation of Amplitude and Phase Distortion in Terms of Paired Echos", Proc. I.R.E. June, 1939, pages 359-385. The number and characteristics of the paired echo sets needed to approximate any particular linear distortion will, of course, depend upon the nature and severity of the distortion as well as the degree of accuracy to which the approximation is required. However, in any event, it is clear that all linear distortions, regardless of their origin, can be expressed as a sum of pre and ghost-echos of the undistorted signal. The generic process of removing distortion from a communication channel, including that of cancelling ghosts therefrom, is referred to as channel equalization and is implemented by devices known as channel equalizers.

It is significant to note that the major complication resulting from the extension of the problem of ghost cancellation to include that of full channel equalization is the requirement to include a facility whereby pre-echos in addition to post-echos may be cancelled. Thus, the problem of channel equalization, the cancellation of pre and post-echos, can be considered to broadly include that of ghost cancellation and a properly designed channel equalizer is therefore also capable of cancelling ghost producing post-echos from a video signal.

Conventionally, ghost cancellation devices employ the technique of delay and attenuation in a feedback or feedward path to eliminate the effect of post-echos caused by multipath transmission. In early devices, adjustable lengths of cable were used to appropriately delay a sample of the main signal which, after being attenuated and recombined with the main signal propagated through the receiver was effective for cancelling the later arriving ghost producing post-echo. In other words, a replica ghost signal is synthesized from the main signal and suitably delayed and attenuated such that, upon re-insertion in the video path, it is effective for cancelling the signal produced in the receiver in response to the later arriving post-echo. Employing generally similar principles more recently proposed ghost cancellation systems utilize charge-transfer devices (CTD) such as bucket-brigade devices (BBD) to effectuate the required delay in the sampled signal. The use of surface acoustical wave devices have also been proposed for this purpose. Exemplary systems of the foregoing type are disclosed in U.S. Pat. No. 3,935,536 issued Jan. 27, 1976 to Kimura et al. and U.S. Pat. No. 3,956,585 issued May 11, 1976 to Butler et al.

In addition to the attenuation and delay functions, an operable ghost cancellation system also includes means for appropriately setting the attenuators and delay lines to achieve cancellation of the existing post-echo signals. For this purpose, some prior art devices use manual means which are adjusted while the operator observes the effect on the displayed image. Manual setting techniques of this sort have not proven altogether satisfactory. Other systems use automatic setting techniques. Typically, in known automatic systems, signal processing circuits are utilized to define the post-echo signal or signals associated with a reference signal and to appropriately set the delay and attenuation necessary to eliminate the thusly defined post-echos. The horizontal synchronizing pulses of a transmitted television signal are sometimes used as the reference signal for this purpose.

Apparatus for achieving complete equalization of a video channel are also known in the art and, conceptually, are quite similar to the previously discussed ghost cancellation systems. Normally, a device, such as a transversal filter, capable of synthesizing replica signals of both the pre and post-echo components of a distorted video signal is automatically controlled for cancelling or equalizing the effect of the channel distortion represented by the pre and post-echos. Control of the transversal filter is typically accomplished by an adaptive control unit which is responsive to a broadcast reference signal. The reference signal comprises a signal whose time waveshape is standardized at the transmitter and, preferably, stored in memory at the receiver and, preferably, includes spectral components covering the entire video bandwidth of approximately 4.2 megahertz thereby enabling equalization of the entire channel. In the control unit, an error criteria is employed to compare samples of the received reference signal with stored samples of what it should be for the case of undistorted transmission. The results of the comparison are then used to adjust the delays and attenuation of the replica signals developed by the transversal filter to minimize the distortion. Automatic equalization systems of the foregoing type are disclosed in articles by E. Arnon entitled, "An Adaptive Equalizer for Television Channels", IEEE Transactions on Communication Technology, Vol. COM-17, No. 6, December, 1969, page 726 and in an article by H. Rudin, Jr. entitled "Automatic Equalization Using Transversal Filters", IEEE Spectrum, January, 1967, page 53.

One significant problem associated with the use of automatic equalizers of the type discussed above is that the relatively high video base band frequencies of television signals preclude the use of much currently available signal processing technology. That is, according to Nyquist sampling theory, the highest frequency component which can be recovered from a sampled signal is one-half of the sampling frequency. Therefore, in order to recover the 4.2 megahertz components of the reference signal, thereby enabling equalization of the full channel bandwidth, the control unit must be capable of operating at a sampling rate of at least 8.4 megahertz. To satisfy the requirement of sampling the reference signal at a rate of at least 8.4 megahertz, prior art full bandwidth automatic equalizers for television channels have employed various sorts of specialized equipment all of which is relatively expensive and typically extensive in nature rendering their incorporation in commercial television receivers quite infeasible. In particular, analog elements such as operational amplifiers, integrators, differentiators, and multipliers are either unavailable at these frequencies (i.e. equal to or exceeding about 8.4 megahertz) or where available are prohibitively expensive. Digital techniques suffer the same difficulties. Digital to analog converters and analog to digital converters are either very expensive or do not operate at these frequencies. The microprocessor and related digital logic formulations, although quite attractive due to their potential low cost and computational capabilities, are especially limited in this respect. Partly for this reason prior art attempts to achieve computationally powerful and functionally adaptive ghost cancellation and channel equalization systems, particularly as part of a commercial television receiver, have been severely hampered. In particular, it would be highly desirable to provide a facility enabling the use of computationally powerful, although relatively slow speed, digital apparatus (e.g. a microprocessor) with relatively high video base band frequencies to achieve ghost cancellation as well as full bandwidth equalization of television channels. Considering the ever decreasing cost of digital logic, the inclusion of such systems in commercial television receivers provides the capacity for heretofore unrealized improvements in the quality of television signal reproduction.

SUMMARY OF THE INVENTION

It is, accordingly, a general object of the present invention to provide a novel automatic channel equalization system and method.

Another object of the present invention is to provide an improved automatic channel equalization system useful in association with commercial television receivers.

A further object of the present invention is to provide an automatic channel equalization system capable of equalizing the full bandwidth of a television channel using relatively slowspeed, high-density signal processing technology.

In accordance with the invention an automatic channel equalization system includes a transversal equalizer responsive to an adaptive and automatic control section for reducing the distortion in a television channel. The control section is operative for developing set point data controlling the state of the transversal equalizer to minimize the distortion exhibited by a reference signal transmitted through the channel, the reference signal including spectral components covering the full bandwidth of the television channel. In order to satisfy the Nyquist sampling requirement, the television line including the transmitted reference signal is coupled through a time base expander to the control section. The time base expander, under the control of a timing network, samples the television line including the reference signal at a rate at least equal to twice the bandwidth of the television channel and subsequently reconstructs the sampled television line for application to the control section at a relatively slow rate compatible with relatively slow-speed, high-density digital logic formulations.

BRIEF DESCRIPTION OF THE DRAWINGS

FIG. 5 depicts, in block diagram form, a channel equalization system employing one embodiment of the present invention.

FIG. 6 depicts, in block diagram form, a channel equalization system employing another embodiment of the present invention.

FIG. 7 illustrates pertinent portions of the present invention shown generally in FIGS. 5 and 6.

DESCRIPTION OF THE PREFERRED EMBODIMENTS

Figure 1:
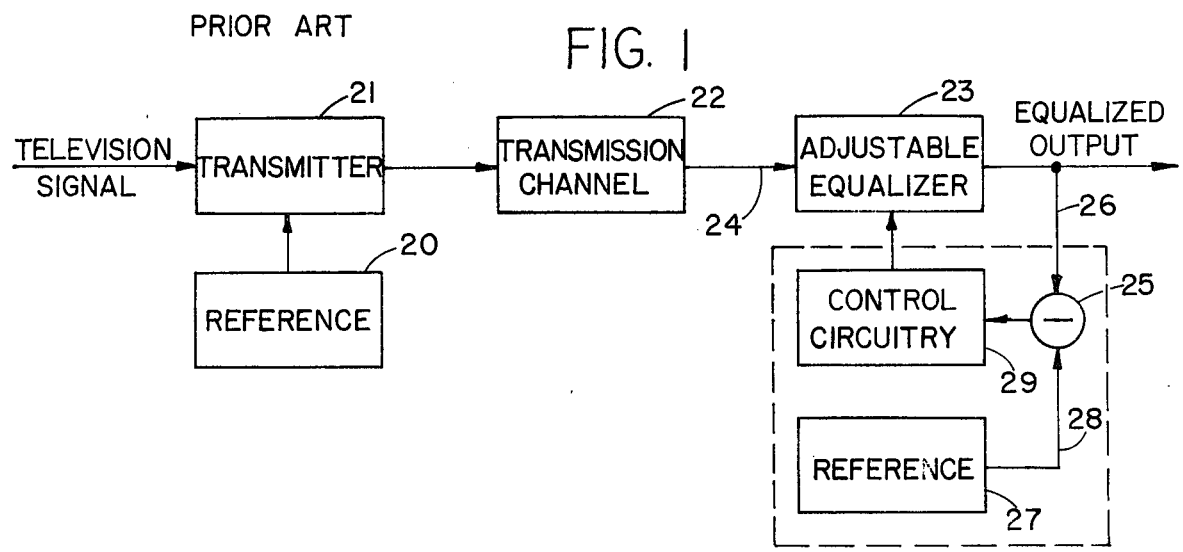
FIG. 1 is a block diagram illustrating the general arrangement of prior art automatic channel equalization systems.

In order to most easily understand the present invention, it will be helpful to review briefly the operating characteristics of a typical prior art television channel equalization system as illustrated in FIGS. 1-4. Accordingly, the general scheme conventionally used to achieve automatic equalization of a television channel is represented in block diagram form in FIG. 1. To establish a reference against which the television channel is to be equalized, a reference signal is coupled from a reference generator 20 to a television signal transmitter 21 for broadcast over the television channel. While the reference signal supplied to transmitter 21 is typically a specially constructed signal added to the television signal, for example during the vertical retrace interval, an already existing component of the television signal, e.g. the horizontal synchronizing pulses or suitable portions of the VIR and/or VIT signals, may alternatively be utilized for supplying the needed reference information. The television signal including the reference signal is transmitted by transmitter 21 over a transmission channel 22 normally including an "over the air" path and the signal path of a television receiver. The output of transmission channel 22 comprises a distorted representation of the originally transmitted television signal, including a similarly distorted representation of the transmitted reference signal, which is coupled to an adjustable equalizer 23 over a line 24. Typically, adjustable equalizer 23 is operative for equalizing transmission channel 22 in the video section of the television receiver so that line 24 represents a portion of the video signal path of the television channel.

The output of adjustable equalizer 23 is coupled to one input of a difference amplifier 25 over a line 26 while the output of a second reference generator 27 is coupled to the other input of difference amplifier 25 over a line 28. Reference generator 27 is configured for constructing and supplying to difference amplifier 25 an exact replica of the originally transmitted reference signal developed by reference generator 20. A control circuit 29 samples the output of difference amplifier 25 during the occurrence of the television line containing the transmitted reference signal. Since the output of difference amplifier 25 during the sampled television line comprises the difference between the television line including the reference signal distorted by transmission channel 22 and the television line including the undistorted reference signal, the information supplied control circuit 29 by difference amplifier 25 comprises a representation of the distortion characterizing transmission channel 22. Control circuit 29 includes appropriate means for processing this information and for setting adjustable equalizer 23 for eliminating the distortion thereby equalizing transmission channel 22. It will therefore be appreciated that the output of adjustable equalizer 23 comprises an equalized or undistorted representation of the video signal on line 24.

Figure 2:
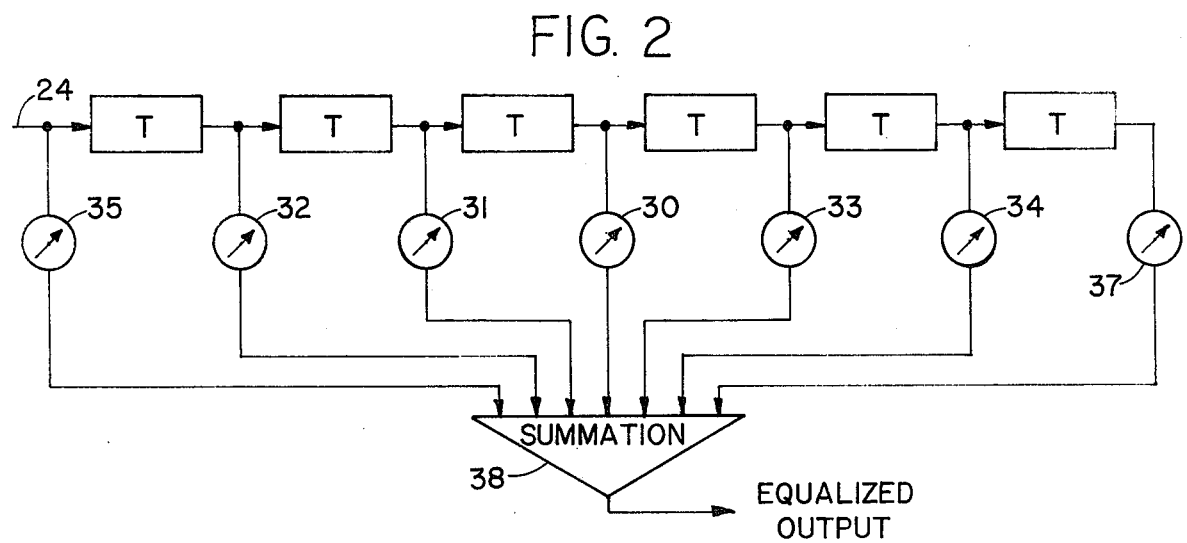
FIG. 2 is a block diagram illustrating a transversal equalizer suitable for use in the system shown in FIG. 1.

Adjustable equalizer 23 typically comprises a transversal filter as shown in FIG. 2. Transversal filter 23 comprises a multitap delay line having a fixed delay T between adjacent taps. The signal applied to the input of the delay line over line 24 is picked off from the taps through a series of variable attenuators 30-35, 37. The output of variable attenuators 30-35, 37 are applied to a sumation network 38 whose output comprises the equalized output applied to difference amplifier 25 and to the remaining circuitry of the television receiver for reproducing the televized image.

By way of example, the adaptive television equalizer disclosed in the previously mentioned Arnon article uses a test pulse transmitted during the vertical interval as a reference signal. The test pulse is obtained by low-pass filtering to 4.6 megahertz a 109 nanosecond rectangular pulse and inserting it into the television signal once per frame. The television line including the test pulse is sampled by a control unit at a rate of 9.2 megahertz and compared to an undistorted representation of the sampled television line at the sampling points. An algorithm for minimizing the absolute error of the comparisons is implemented by the control unit which develops set point data for operating a transversal filter to equalize the channel. The filter includes 20 taps equally spaced by delays of 109 nanoseconds and digitally controlled ± 255 step attenuators operated by the control unit.

Figure 3:
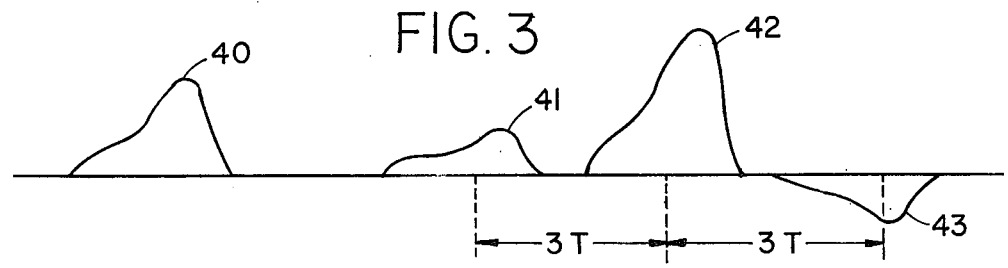
FIG. 3 shows a set of signal waveforms pertinent to the operation of the system shown in FIG. 1.
Figure 4:
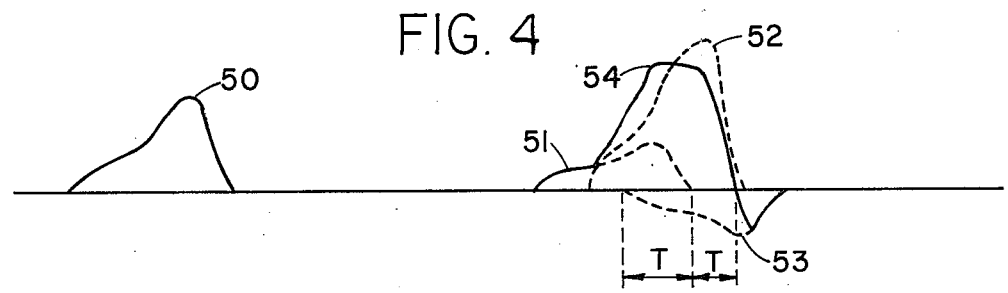
FIG. 4 shows another set of signal waveforms pertinent to the operation of the system shown in FIG. 1.

The operation of an adjustable equalizer/transversal filter of the type used in the Arnon system and illustrated in FIG. 2 to equalize television transmission channel 22 may be conveniently explained with the aid of the waveforms depicted in FIGS. 3 and 4. It will be recalled that any linear distortion produced by a communication channel can be represented by an appropriate series of paired echos distributed about the undistorted signal. In FIG. 3, waveform 40 represents a signal intended to be transmitted through transmission channel 22. Waveforms 41, 42 and 43 represent the signal actually received by the television receiver in response to the broadcast of the signal represented by waveform 40. In the received signal it will be noted that waveform 42 consists of an undistorted representation of the originally transmitted waveform whereas waveform 41 comprises a pre-echo having the same shape but leading waveform 42 by an amount 3T and waveform 43 comprises an inverted post-echo having the same shape but lagging waveform 42 in time by the amount 3T. Assuming that waveform 40 comprises a test pulse transmitted during the reference television line, difference amplifier 25 substracts undistorted waveform 42 from the received television line consisting of waveforms 41, 42 and 43 so that only the distortion representing waveforms 41 and 43 are sampled by control circuit 29. Control circuit 29 processes distortion representing waveforms 41 and 43, such as by the absolute error algorithm practiced by the Arnon system, and appropriately sets variable attenuators 30-37 to cancel the distortion in transmission channel 22 represented thereby. In the case illustrated in FIG. 3, center-tap attenuator 30 of the delay line is set at unity, attenuator 35 is set at a negative value for deriving a pre-echo replica signal for cancelling waveform 41 and symmetrically located attenuator 37 is set at a positive value for deriving a post-echo replica signal for cancelling waveform 43. While a secondary echo signals will be produced by passing the received signal comprising waveforms 41, 42, and 43 through attenuators 35 and 37, these secondary echos will be severely reduced in amplitude compared to the amplitudes of waveforms 41 and 43. Further taps on transversal filter 23 may be appropriately set to eliminate the effect of the secondary echo signals.

FIG. 4 illustrates a distortion characteristic somewhat similar to that depicted in FIG. 3 for the case of close in echo signals. Thus, waveform 50 represents the test pulse or reference signal broadcast through transmission channel 22 by transmitter 21. Waveform 52 represents the undistorted component of the received signal, waveform 51 represents the pre-echo component of the received signal leading the undistorted component in time by T and waveform 53 represents the post-echo component of the received signal delayed in time from undistorted component 52 in time by the amount T. The resultant or composite wave form produced by components 51, 52 and 53 is shown by a waveform 54. To equalize the distortion in transmission channel 22 represented by waveforms 51, 53, center tap attenuator 30 of transversal filter 23 is again set to unity. However, since the echo delay is only T, symmetrically located attenuators 31 and 33 would be set to a value for cancelling the echo waveforms.

It will be appreciated that a similar procedure can be followed for equalizing transmission channel 22 for any linear distortion affecting the channel. This procedure involves, of course, resolving the received television line including the reference signal into its undistorted component and a series of paired echos defining the distortion. Appropriate ones of the variable attenuators of transversal filter 23 are then set to cancel at least some of the distortion producing echo signals to achieve a desired response.

As previously discussed, in order to fully equalize a television channel the transmitted reference signal must include spectral components covering the entire bandwidth of the channel. Furthermore, sampling theory indicates that the highest frequency component which can be recovered from a sampled signal is one half of the sampling frequency. Therefore, since the nominal television signal bandwidth is about 4.2 megahertz, the television line including the reference signal must be sampled at a rate at least equal to 8.4 megahertz. It will be recalled that the Arnon systems employs a sampling rate of 9.2 megahertz. This criteria significantly complicates the task of television channel equalization primarily by limiting the signal processing circuitry to relatively specialized high-speed equipment.

The foregoing problem is overcome by the present invention by the technique illustrated in FIGS. 5–7. In FIG. 5, a control section 60, comprising difference amplifier 25, reference generator 27 and control circuit 29 controls adjustable equalizer 23 to equalize television channel 22 as previously explained. However, in lieu of directly sampling the output of equalizer 23 through difference amplifier 25, control section 60 is coupled to the output of equalizer 23 through a time base expander 61 which operates under the control of a timing circuit 62. The timing circuit 62 identifies the television line containing the reference signal and causes time base expander 61 to sample the line at a relatively fast rate, i.e. at a rate at least equal to 8.4 megahertz. After the television line including the reference signal has transpired, time base expander 61 is caused by timing circuit 62 to reconstruct the sampled television line at a relatively slow rate for application to control section 60 over a line 63. The reconstruction rate of the television line is slow enough to enable the use of slow-speed, high-density MOS circuitry or the like. The reconstructed data supplied to control section 60 is processed to control adjustable equalizer 23 as previously explained.

In FIG. 6, an arrangement is shown similar to that of FIG. 5 except that time base expander 61 and timing circuit 62 are connected to line 24 up stream of adjustable equalizer 23 instead of down stream as shown in FIG. 5. Operation of the system, however, is substantially the same as previously discussed. Time base expander 61, under control of timing circuit 62, samples the television line including the transmitted reference signal at a relatively fast rate. The sampled television line is then reconstructed at a relatively slow rate for application to control section 60. Control section 60 processes the reconstructed television line for defining the distortion producing echo signals and sets adjustable equalizer 23 to equalize the television channel by cancelling these echos. Significantly, since data is fed to control section 60 at a slow rate, inexpensive high density, although slow speed, signal processing technology may be employed to achieve the necessary signal processing capabilities.

In FIG. 7, a preferred, although not necessarily limiting, method of implementing the time base expansion technique discussed above is shown. Time base expander 61 comprises a charge transfer device 64 coupled between control section 60 and either the input or output of adjustable equalizer 23. Charge transfer device 64 preferably comprises a charge coupled device, such as that manufactured by Fairchild Camera and Instrument Corporation under designation CCD321, which, under the control of a proper sequence of clock pulses, moves quantities of electrical charge in a controlled manner across the semiconductor substrate. Timing circuit 62 comprises a synchronizer 65 having an input connected in common with the input charge injection port of charge transfer device 64 and an output 67 coupled to a counter 66. Synchronizer 65 also includes a reset output coupled to counter 66 over a line 68. Finally, the output of counter 66 is supplied to a variable frequency clock 69 whose output is in turn coupled to the clock control input of charge transfer device 64.

In operation, synchronizer 65, which may comprise, for example, a conventional synch separator wherein output 67 consists of the horizontal synch output and output 68 the vertical synch output, generates a reset signal on line 68 in response to the occurrence of each vertical synchronizing pulse of the received television signal for resetting counter 66 to an initial value. Subsequently, counter 66 counts the horizontal synchronizing pulses of the transmitted television signal until a count is reached corresponding to the television line including the reference signal. At this time, counter 66 causes clock 69 to develop a relatively high frequency clock signal for application to the clock control input of charge transfer device 64. This frequency should be sufficient to cause charge transfer device 64 to sample the reference signal containing television line at a rate at least equal to 8.4 megahertz although a somewhat higher sampling rate of about 14 megahertz is considered preferable. After the 63.5 microsecond duration of the sampled television line, counter 66 causes clock 69 to develop and supply to charge transfer device 64 a relatively low frequency clock signal. This low frequency clock signal causes charge transfer device 64 to shift out the previously sampled data on line 63 thereby reconstructing the sampled reference television line for application to control section 60. For efficient utilization of presently available slow-speed, high-density digital logic such as MOS circuitry in the implementation of control section 60, the data is preferably reconstructed at a rate of about 250 kilohertz. At this rate, it will take about 3.6 miliseconds to reconstruct the sampled television line for application to control section 60. Control section 60 processes the reconstructed television line as previously explained and appropriately sets the attenuators of adjustable equalizer 23 to minimize the distortion determined present in transmission channel 22.

Figure 8:
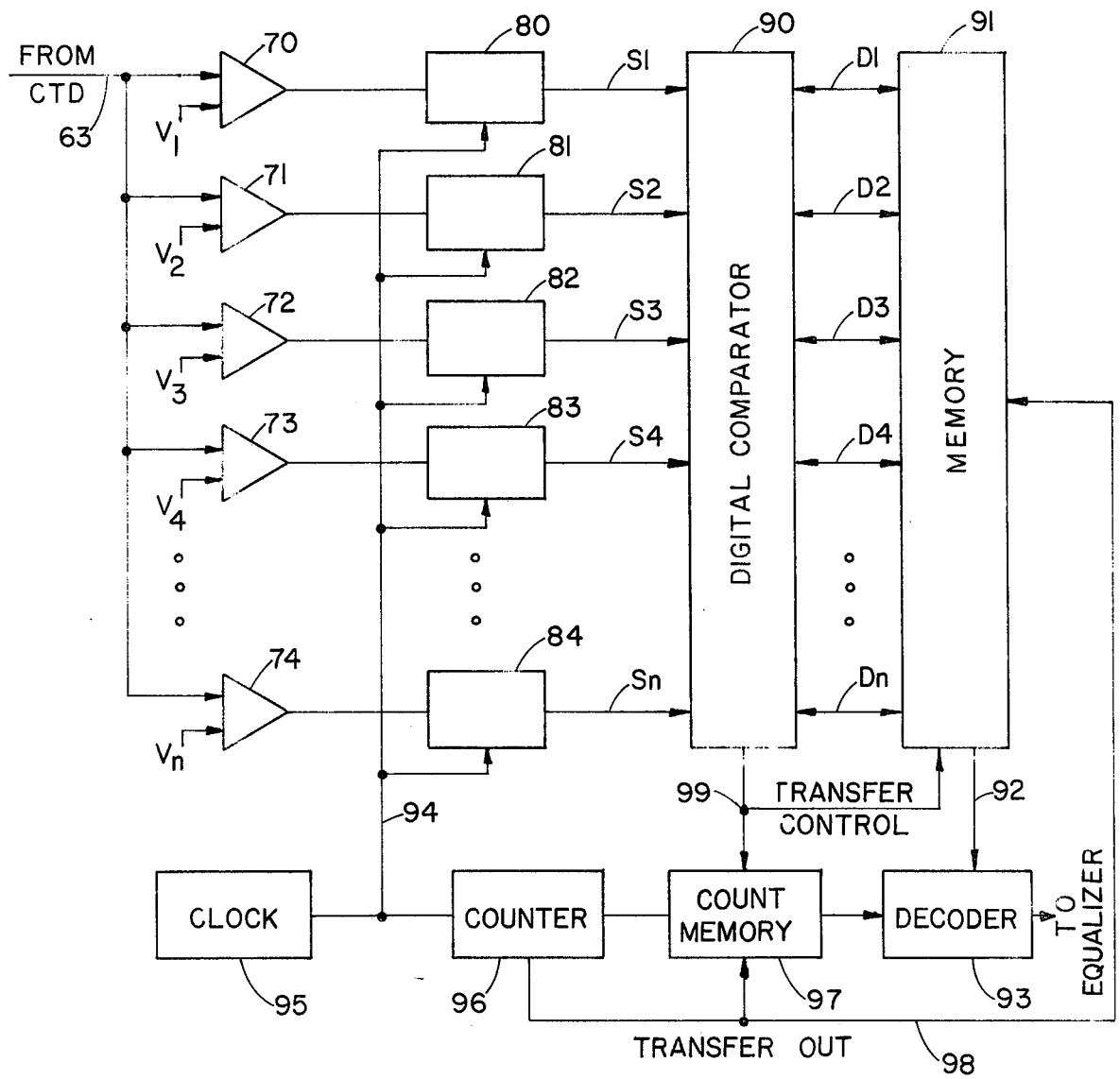
FIG. 8 is a block diagram of a control section useful with a channel equalization system constructed according to the present invention.

An alternate embodiment of implementing control section 60 for cancelling ghost producing post-echo signals is shown in FIG. 8. A plurality of analog comparators 70-74, each have an input connected to line 63 for receiving the reconstructed television line from charge transfer device 64. In this regard, it will be appreciated that charge transfer device 64 may include suitable filtering circuitry for providing an analog rather than a digital output. A second input of each analog comparator 70-74 is connected for receiving, respectively, a reference signal $V_1$-$V_n$. A plurality of sample and hold amplifiers 80-84 couple the outputs of analog comparators 70-74 to a digital comparator 90 over a plurality of outputs $S_1$-$S_n$. Digital comparator 90 interfaces with a memory 91 through a series of data transfer lines $D_1$-$D_n$, memory 91 in turn having an output 92 connected to a decoder 93.

The operation of sample and hold amplifiers 80-84 is controlled by timing signals developed on a timing bus 94 by a clock 95. The timing signals developed by clock 95 are also coupled to a counter 96 which, in turn, is coupled to decoder 93 through a count memory 97. Transfer of data from memory 91 and count memory 97 to decoder 93 is controlled by signals developed on a transfer out line 98 by counter 96. Transfer of data into memory 91 from digital comparator 90 and into count memory 97 from counter 96 is controlled by signals developed on a transfer control line 99 by digital comparator 90.

Figure 9:
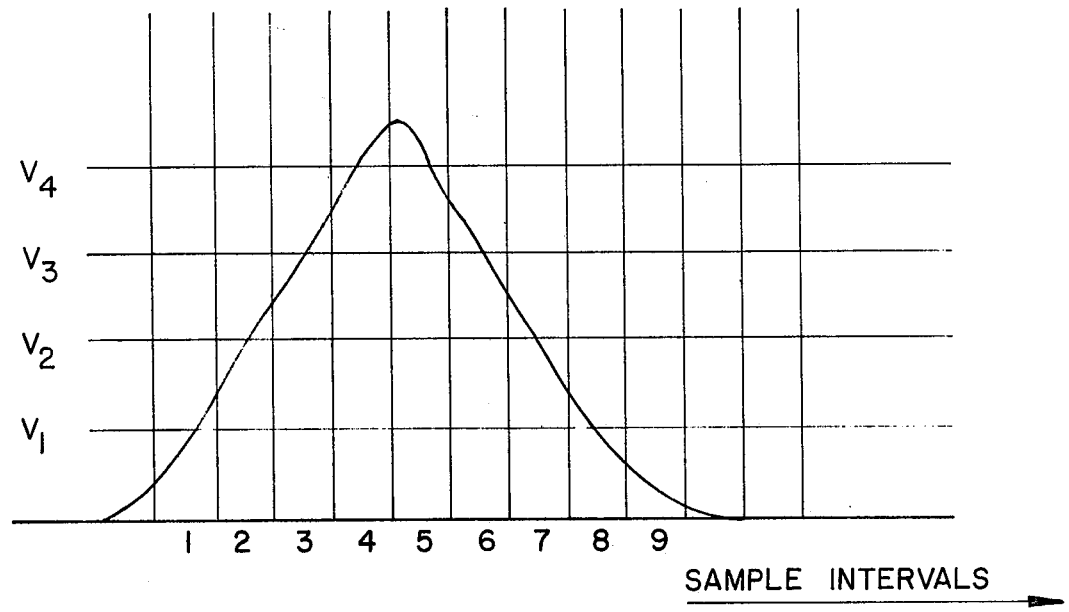
FIG. 9 shows a signal waveform and a related explanatory table pertinent to the operation of the control section illustrated in FIG. 8.

Operation of the embodiment of control section 60 illustrated in FIG. 8 is conveniently explained with reference to the waveform and table of FIG. 9. The waveform illustrated in FIG. 9 represents a ghost producing post-echo signal developed in a portion of the reconstructed television line supplied to control section 60 from charge transfer device 64. The coordinate system on which the echo waveform is represented has a horizontal axis divided into sample intervals as determined by clock 95 and a vertical axis defining the amplitude of the echo waveform in terms of reference voltages $V_1$-$V_n$. The table of FIG. 9 presents the binary signals appearing on lines $S_1$-$S_n$ during the sample intervals defining the echo waveform.

In operation, each of the analog comparators 70-74 continuously compares the reconstructed television line against its respective voltage $V_1$-$V_n$. A logically high output is developed whenever the amplitude of a signal occurring in the reconstructed television line exceeds the reference voltage of one of the analog comparators 70-74, otherwise a logically low level signal is developed. Under the control of clock 95, sample and hold amplifiers 80-84 simultaneously sample of output of analog comparators 70-74 at the beginning of each sampling interval and hold the sampled value for the remainder of the interval. Thus, during the first sample interval, the outputs $S_1$-$S_n$ of sample and hold amplifiers 80-84 are all logically low because the amplitude of the echo waveform is less than the smallest reference voltage $V_1$ at the beginning of sampling point of the sampling interval. At the beginning of the second sampling interval the amplitude of the echo waveform exceeds reference voltage $V_1$ only so that output $S_1$ is logically high while the other outputs $S_2$-$S_n$ remain logically low. The logical level of outputs $S_1$-$S_n$ are similarly determined during subsequent sampling intervals. For example, at the beginning of the fifth sampling interval the amplitude of the echo waveform exceeds reference voltage, $V_4$ so that the output on lines $S_1$-$S_4$ are all logically high. Finally, at the beginning of the ninth sampling interval outputs $S_1$-$S_n$ are all reinstated to a logical zero level since the amplitude of the echo waveform has again dropped below reference voltage $V_1$. During the foregoing process, counter 96 keeps track of the sampling intervals by counting the clock pulses developed by clock 95.

Digital comparator 90 is operative for repetitively comparing the value of the binary number represented by the logical condition of outputs $S_1$-$S_n$ of sample and hold amplifiers 80-84 with the content of memory 91. Whenever the amplitude of a signal occurring in the reconstructed television line, as defined by outputs $S_1$-$S_n$, exceeds the content of memory 91, a transfer control signal is developed on line 99 by digital comparator 90 causing count memory 97 to read and store the current value of counter 96 and causing memory 91 to replace its content with the value of the binary number represented by the signals on outputs $S_1$-$S_n$.

Thus, with reference to FIG. 9, the final content of memory 91 (i.e. after the complete reconstructed television line has been processed) will substantially define the amplitude of the peak point of the echo waveform and the contents of count memory 97 will indicate that the peak value of the echo waveform occurred during a particular sample interval, in this case during the fifth sample interval. At the end of the reconstructed television line counter 96 develops a transfer out signal on line 98 causing memory 91 and count memory 97 to transfer their contents, defining the amplitude and position of the echo waveform, to decoder 93. Decoder 93 decodes this data for developing appropriate set point data for setting adjustable equalizer 23 to cancel the echo waveform.

While particular embodiments of the present invention have been shown and described, it will be apparent that changes and modifications may be made therein without departing from the invention in its broader aspects. For example, although techniques for achieving full channel equalization have been described herein, it will be recognized that substantially similar techniques are applicable to partial equalization. That is, to equalize 3 megahertz of a nominally 4.2 megahertz channel, a sampling rate of at least 6 megahertz instead of 8.4 megahertz would be employed. The aim of the appended claims, therefore, is to cover all such changes and modifications as fall within the true spirit and scope of the invention.

What is claimed is:

1. An automatic equalization system for equalizing a television channel according to the distortion exhibited by a reference signal contained in a television signal transmitted through said channel, said system comprising:

signal equalization means connected in the path of said television channel, said equalization means being selectively controllable for equalizing said television channel;

conversion means having an input connected to said path for sampling said television signal at a relatively fast rate during intervals including said reference signal and having an output for subsequently reconstructing said sampled television signal at a relatively slow rate; and control means responsive to said output of said conversion means for deriving from said reconstructed television signal set point data controlling said equalization means for equalizing said television channel.

2. The automatic equalization system according to claim 1 wherein said reference signal includes spectral components for exercising a portion of the bandwidth to said television channel and wherein said conversion means comprises means having an input connected to said path for sampling at a rate equal to at least substantially twice said portion of the bandwidth of said television channel.

3. The automatic equalization system according to claim 2 wherein said reference signal is contained within a television line of said television signal and includes spectral components for exercising substantially the full bandwidth of said television channel, said conversion means comprising means having an input for sampling said television line at a rate equal to at least substantially twice the bandwidth of said television channel.

4. The automatic equalization system according to claim 3 wherein said control means comprises a relatively slowspeed, high-density digital logic and memory formulation.

5. The automatic equalization system according to claim 4 wherein said conversion means comprises:
   a charge transfer device having an input signal injection port connected to said path and an output for supplying said control means, said charge transfer device further having a clock control input for receiving a clock signal defining the data transfer rate of said charge transfer device; and
   timing means having an input connected to said path and an output for supplying said clock control input, said timing means developing a first clock signal for causing said charge transfer device to sample said television line at said relatively fast rate and subsequently developing a second clock signal for causing said charge transfer device to reconstruct said sampled television line at said relatively slow rate.

6. The automatic equalization system according to claim 5 wherein said television line comprises a predetermined line in the vertical interval of said transmitted television signal and wherein said timing means comprises:
   clock means operable for developing said first and second clock signals;
   means for detecting the vertical and horizontal synchronizing pulses of said television signal; and
   means responsive to said means for detecting for counting the horizontal synchronizing pulses in said television signal occurring subsequently of a detected vertical synchronizing pulse for identifying said predetermined line, said means for counting operating said clock means for developing said first clock signal substantially during the duration of said predetermined line and for developing said second clock signal thereafter.

7. The automatic equalization system according to claim 1 wherein said input of said conversion means is connected to the video path of said television channel up-stream of said signal equalization means.

8. The automatic equalization system according to claim 1 wherein said input of said conversion means is connected to the video path of said television channel down-stream of said signal equalization means.

9. In an automatic equalization system of the type having signal equalization means connected in the video path of a television channel and control means operating said equalization means for equalizing said television channel according to the distortion exhibited by a reference signal occurring in a television line of a transmitted television signal, the improvement comprising:
   time base expansion means coupled between said video path and said control means operable for expanding the time base of signals appearing on said video path for application to said control means; and
   timing means connected to said video path for operating said time base expansion means for expanding the time base of said television line including said reference signal.

10. The improvement according to claim 9 wherein said reference signal includes spectral components for exercising substantially the full bandwidth of said television channel and wherein said time base expansion means comprises means for sampling said television line including said reference signal at a rate at least equal to substantially twice the bandwidth of said television channel and for subsequently reconstructing said sampled television line for application to said control means at a relatively slow rate compatible with the operating speed of MOS signal processing technology.

11. The improvement according to claim 10 wherein said means for sampling and reconstructing comprises a charge transfer device and a variable frequency clock for operating said charge transfer device in response to said timing means.

12. The method of equalizing a television channel according to the distortion exhibited by a reference signal contained in a television signal transmitted through said channel comprising the steps of:
   sampling said television signal at a relatively fast rate during intervals including said reference signal;
   reconstructing said sampled television signal at a relatively slow rate;
   determining the distortion characterizing said television channel from said reconstructed television signal; and
   equalizing said television channel according to said determination.

13. The method according to claim 12 wherein said reference signal is contained within a television line of said television signal and includes spectral components for exercising a portion of the bandwidth of said television channel, said sampling step comprising the step of sampling the television line including said reference signal at a rate at least equal to substantially twice said portion of the bandwidth of said television channel.

14. The method according to claim 13 wherein said reconstructing step comprises the step of reconstructing said sampled television line at a rate compatible with relatively slow-speed, high-density MOS signal processing technology.

15. The method according to claim 12 including, intermediate said sampling and reconstructing steps, the step of storing said sampled television line for a relatively brief period.

16. In a method of addressing control means of the type responsive to a reference signal occurring during a television line transmitted through a television channel for operating signal equalization means for equalizing said television channel, the improvement comprising the steps of:
   sampling the television line including said reference signal at a relatively fast rate; and
   reconstructing said sampled television line at a relatively slow rate for application to said control means.

17. The improvement according to claim 16 including the step of storing said sampled televisin line for a brief period prior to said reconstruction step.

18. The improvement according to claim 16 wherein said reference signal includes spectral components for exercising substantially the full bandwidth of said channel and wherein said sampling step comprises the step of sampling the television line including said reference signal at a rate at least equal to substantially twice the bandwidth of said television signal.

19. The improvement according to claim 18 wherein said reconstructing step comprises the step of reconstructing said sampled television line at a rate compatible with relatively slow-speed, high-density signal processing technology.

* * * * *